July 21, 1925. 1,546,369

H. A. DE VRY

MOTION PICTURE MACHINE

Filed Jan. 24, 1920 4 Sheets-Sheet 1

Witness:
John Endere

Inventor:
Herman A. de Vry
by Fred Gerlach
his Atty.

July 21, 1925.

H. A. DE VRY 1,546,369

MOTION PICTURE MACHINE

Filed Jan. 24, 1920

4 Sheets-Sheet 3

Witness:
John Enders

Inventor:
Herman A. de Vry
by Fred Gerlach
his Atty.

July 21, 1925.

H. A. DE VRY

MOTION PICTURE MACHINE

Filed Jan. 24, 1920

1,546,369

4 Sheets—Sheet 4

Witness:
John Enders

Inventor:
Herman A de Vry
by Fred Gerlach
his Atty.

Patented July 21, 1925.

1,546,369

UNITED STATES PATENT OFFICE.

HERMAN A. DE VRY, OF CHICAGO, ILLINOIS, ASSIGNOR TO THE DE VRY CORPORATION, OF CHICAGO, ILLINOIS, A CORPORATION OF ILLINOIS.

MOTION-PICTURE MACHINE.

Application filed January 24, 1920. Serial No. 353,805.

*To all whom it may concern:*

Be it known that I, HERMAN A. DE VRY, a citizen of the United States, and a resident of Chicago, in the county of Cook and State of Illinois, have invented certain new and useful Improvements in Motion-Picture Machines, of which the following is a full, clear, and exact description.

The invention relates to motion picture machines.

One object of the invention is to provide an improved moving picture machine in which provision is made for accurately setting the lamp and reflector for efficient projection. In practice, it has been found that greater efficiency is obtained by placing the lamp so as to present the flat plane of the filament to the film. The invention is designed to provide an improved lamp-house and lamp-support which make it possible to set the lamp for this efficiency.

Another object of the invention is to provide an improved lamp-house which is removable to facilitate inspection and replacement of the lamp.

Another object of the invention is to provide an improved projector in which the lamp-house, reflector, and condenser are conjointly removable.

Another object of the invention is to provide a construction in which the reflector is supported so that there will be no danger of overheating it and thus prevent the reflecting medium from peeling off.

Other objects of the invention will be apparent from the description.

The invention consists in the several novel features hereinafter set forth and more particularly defined by claims at the conclusion hereof.

Figure 1:
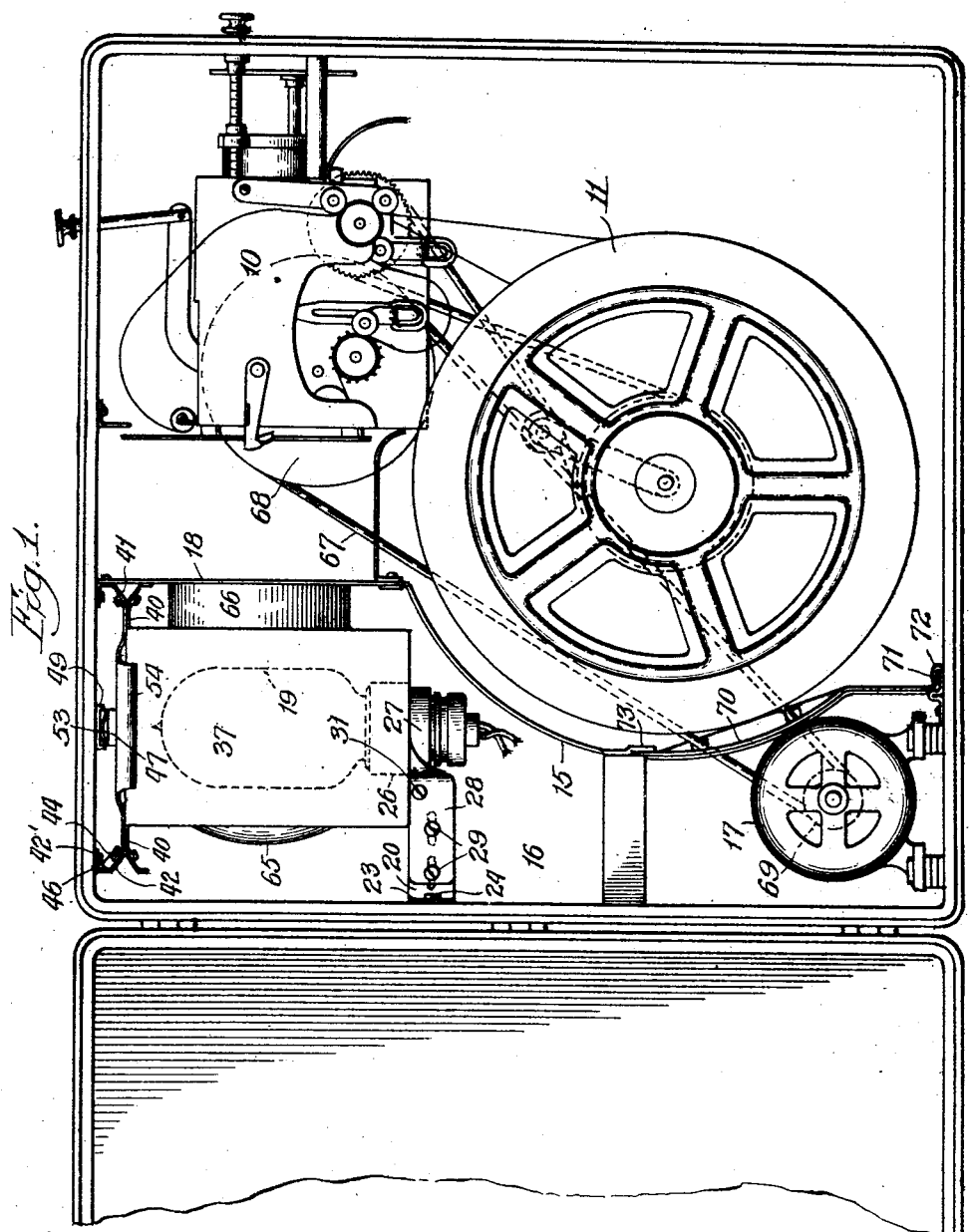
Figure 2:
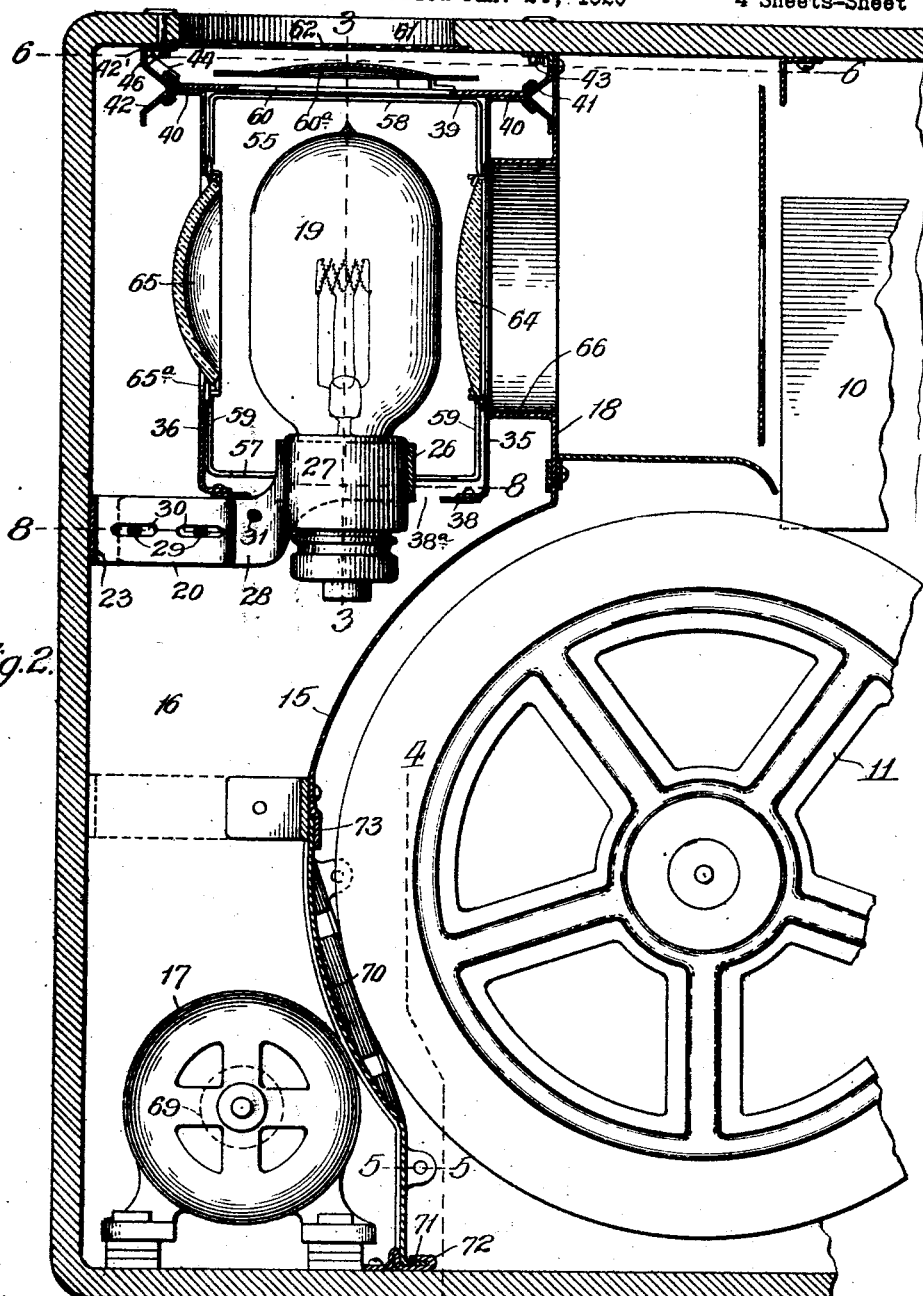
Figure 3:
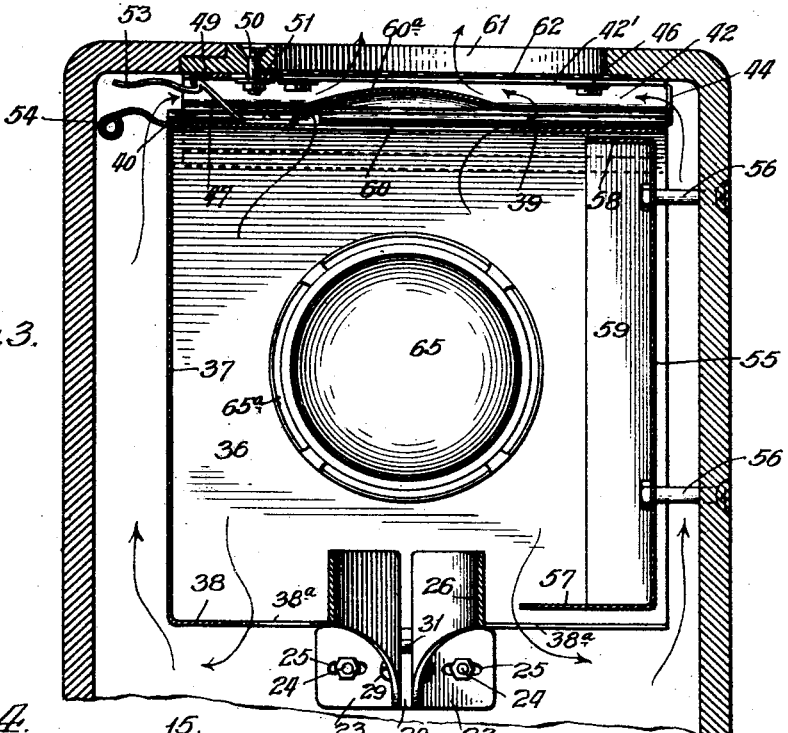
Figure 4:
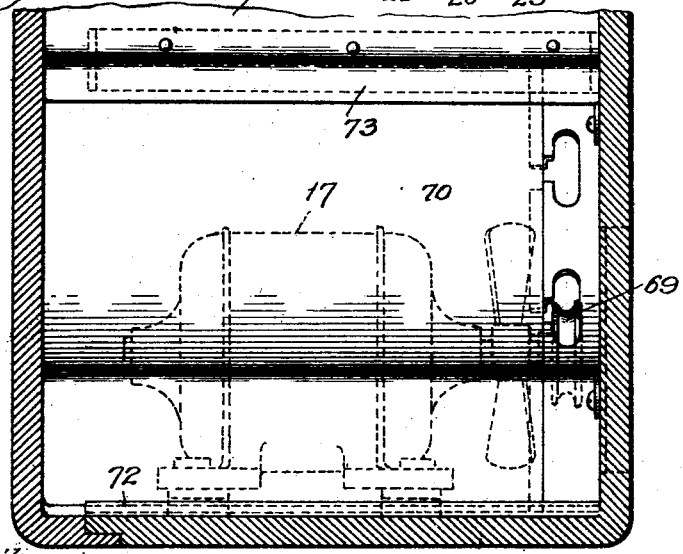
Figure 5:
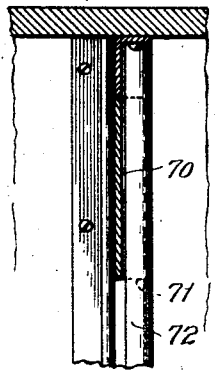
Figure 6:
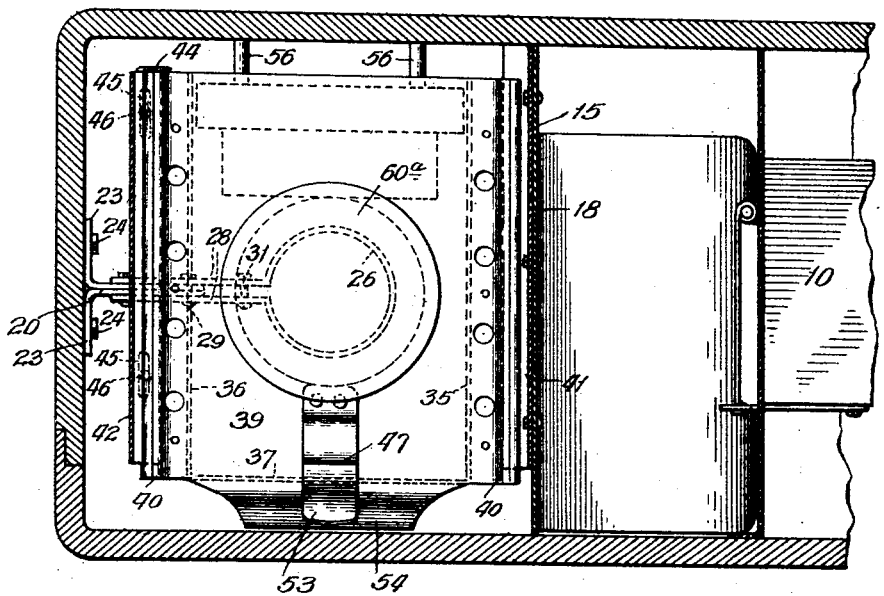
Figure 7:
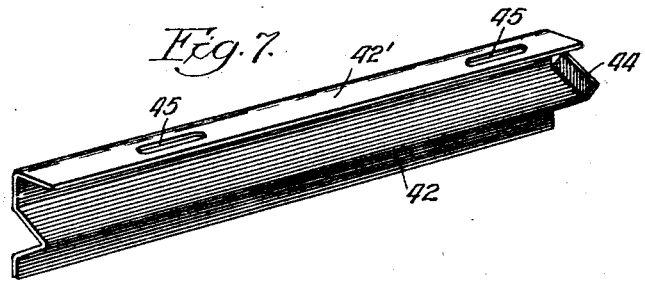
Figure 8:
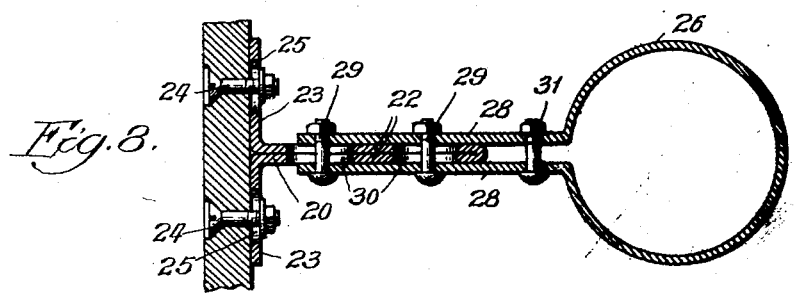

In the drawings: Fig. 1 is a side elevation of a motion picture machine embodying the invention, the cover-case being open. Fig. 2 is a vertical section through the lamp-house and the carrying-case. Fig. 3 is a vertical section taken on line 3—3 of Fig. 2, the lamp being omitted. Fig. 4 is a section on line 4—4 of Fig. 2. Fig. 5 is a section on line 5—5 of Fig. 2. Fig. 6 is a horizontal section taken on line 6—6 of Fig. 2. Fig. 7 is a perspective of one of the supported guides for the lamp-house. Fig. 8 is a section taken on line 8—8 of Fig. 2, the lamp being omitted.

The invention is illustrated in connection with a machine of the general type set forth in Letters Patent No. 1,303,543 dated May 13, 1919. The film-feeding mechanism 10 and co-axial supply and take-up spools 11 and film-guiding means, projecting lens and shutter may be of the arrangement and construction, and operate as, that set forth in said Letters Patent, so that a more particular illustration is not deemed necessary.

A partition 15 extends transversely across the case and divides the space in the case to form a rear compartment 16 adapted to contain, in its lower portion, an electric motor 17 for driving the feed-mechanism and a lamp-house in its upper portion. A portion of this wall is curved in conformity with the film-spools 11 and its upper portion is straight, as at 18, and is rigidly secured to the case.

An incandescent lamp 19 is supported in and independently of the lamp-house. For the purpose of giving rigidity to the lamp-support, it is secured to the carrying-case, as contradistinguished from the lamp-house. The lamp-support comprises a bracket 20 formed of a strip of metal doubled upon itself, as at 22, (Fig. 8) and provided with lugs 23 adapted to fit against the back wall of the case and to be there secured by screws 24. Said screws pass through slots 25 in lugs 23 to permit transverse horizontal adjustment of the bracket to correctly and transversely position the lamp-support in the case. A resilient ring 26 is adapted to pass around the socket 27 for the lamp 19 to support them. This ring is formed of a strip of metal and is provided with integral extensions or arms 28 which lap and are secured to the bracket 20 by bolts 29 which pass through slots 30 in the bracket. Said slots permit fore and aft adjustment of the lamp-support, to effect a corresponding adjustment of the lamp and its socket. A bolt 31 is adapted to contract the ring 26 to removably secure the lamp-socket 27 therein. When the ring is expanded, the lamp-socket 27 is rotatable in the ring and this permits rotary adjustment of the lamp to present the flat plane of the filament to the film for efficient illumination and projection. This lamp-support exemplifies one by which the lamp is supported in and from the case independently of the lamp-house and in which provision is made for universal adjustment of the lamp to attain the highest efficiency in projection.

The lamp-house comprises a front wall 35, a rear wall 36, a side-wall 37, a bottom 38 and a top wall 39, all of which are integral or riveted together to provide a structure which is removable laterally from the carrying case. The bottom is provided with an opening 38ª extending to the inner side of the lamp-house so that the latter may be placed into and out of operative position around the lamp 19 without displacing the lamp. The walls forming the upper portion of the lamp-house are divergently extended, as at 40, to form V-shaped guide-ways adapted to receive the V-shaped supporting-bars 41 and 42 which are fixed to the case. Bar 41 is provided with a flange which is secured to the top of the case by bolts 43. A stop 44 is formed at the inner end of the bar 42 to limit the inward movement of the lamp-house. Bar 42 is formed with a flange 42' which has slots 45 therein to form, with bolts 46, an adjustable connection between said bar and the case, so that the stop 44 may be accurately adjusted to properly position the lamp-house. A resilient latch-strip 47 is secured to the top-wall 39 and is adapted to engage a downwardly projecting tongue on a plate 49 which is adjustably secured to the case by a bolt 50 and slot 51. In practice, it has been found that there are irregularities in carrying cases which frequently result in deficient projection. The adjustable tongue 49 and the adjustable stop 44 make it possible to accurately position and lock the lamp-house in the case. Latch 47 is provided with a finger-piece 53 by which it may be released and the top wall of the lamp-house is provided with a grip 54 below the finger-piece 53. When the finger-piece is depressed, the lamp-house will be released so it can be withdrawn laterally from the case. A plate 55 is secured to, and is in spaced relation with, the carrying-case by studs 56 and is provided with a bottom flange 57, a top-flange 58 and side-flanges 59. An opening 60 is formed in the top wall of the lamp-house. A deflector 60ª is secured to said wall and over said opening 60. An outlet 61 which is protected by a perforated plate 62 is formed in the top wall of the carrying-case. For the purpose of cooling the zone adjacent the lamp to prevent deterioration of the film and excessive heating of the feed-mechanism, the walls of the lamp-house are spaced from the walls of the carrying case, as shown, so that a current of air will circulate through the lamp-house and between the lamp-house and the wall of the carrying-case. In practice, a fan is usually provided for forced circulation through and around the lamp-house, as exemplified in Letters Patent No. 1,287,576. The air passing through the lamp-house escapes through the openings 60 and 61. The air passing around the outside of the lamp-house escapes through the perforations in plate 62 and opening 61. By providing a wall that is fixed in spaced relation to the inner side wall of the carrying case, it becomes possible to remove the lamp-house laterally without interfering with the lamp in the socket.

A condenser-lens 64 is secured in the front wall of the lamp-house and a concave reflector 65 is secured in the back wall of the lamp-house so that these elements will be removable therewith. The reflector is held in an opening 65ª in the back wall of the lamp-house, so both its front and back will be traversed by air currents and cooled thereby. By providing the adjustable stops for positioning the lamp-house in the case, it becomes possible to accurately position the reflector and condenser despite irregularities in the case or other variation. By supporting the reflector in the back wall of the lamp-house and spacing said wall from the back of the case, the reflector is kept sufficiently cool to prevent the reflecting medium from peeling off the glass, it being understood that in these machines the reflector usually consists of glass coated with a reflecting medium. Partition 18 is provided with a tubular flange 66 which extends rearwardly to the front wall of the lamp-house to exclude light from the space between the partition and the front wall of the lamp-house. It will be understood that the exposure opening for the film and the projecting lens are disposed in front of and axially aligned with the condenser and reflector.

The lower portion of the partition 15 is curved to conform to the periphery of the supply and take-up spools. A belt 67 which drives a pulley 68 of the feed-mechanism from a pulley 69 on the shaft of motor 17 is usually disposed adjacent the inner side wall of the case. In practice, it is sometimes desirable to obtain access to this belt for adjustment or replacement. For this purpose, the lower portion of the partition between the spool-chamber and the chamber containing the motor and the lamp-house consists of a slide 70 which is removable laterally, being provided with a lower flange 71 fitted in a guide 72 and having its upper end held in a guide 73.

The invention exemplifies a portable motion picture machine in which the lamp-house is removable and in which provision is made for accurately positioning it so that the condenser and reflector carried thereby will be properly positioned with respect to the picture opening and projector-lens.

The invention exemplifies a lamp-support which permits universal adjustment of the lamp and socket so that the lamp may be set in position for most efficient projection.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a motion picture projector, the combination with a carrying case containing a film, film-feeding mechanism and projecting means, of a lamp-house secured to the case, a fixedly held condenser disposed in the case, a support for the lamp in which it is rotatably adjustable on its own axis to accurately position the filament relatively to the condenser, and means for fixedly securing said lamp in said support.

2. In a motion picture projector, the combination with a carrying case containing a film, film-feeding mechanism and projecting means, of a lamp-house secured to the case, a fixedly held condenser disposed in the case, a support for a lamp in which it is rotatably adjustable on its own axis, to bring its filament into a definite relation to the condenser, an adjustable connection between the support and the case which permits the lamp to be accurately positioned relatively to the condenser, and means for securing the support in its adjusted position.

3. In a motion picture projector, the combination with a carrying case containing a film, film-feeding mechanism and projecting means, of a lamp-house secured to the case, a fixedly held condenser disposed in the case, a support for a lamp, an adjustable connection between the support and the case which permits fore-and-aft adjustment of the lamp to permit it to be accurately positioned relatively to the condenser, and means for securing the support in its adjusted position.

4. In a motion picture projector, the combination with a carrying case containing a film, film-feeding mechanism and projecting means, of a lamp-house secured to the case, a fixedly held condenser disposed in the case, a support for a lamp, an adjustable connection between the lamp and the case which permits transverse adjustment of the support to accurately position the lamp relatively to the condenser, and means for securing the support in its adjusted position.

5. In a motion picture projector, the combination with a carrying case containing a film, film-feeding mechanism and projecting means, of a lamp-house secured to the case, a fixedly held condenser disposed in the case, a support for a lamp, adjustable connections for said support which permit fore-and-aft and transverse adjustment of the support to accurately position the lamp relatively to the condenser, and means for securing the lamp in its adjusted position.

6. In a motion picture projector, the combination with a carrying case containing a film, film-feeding mechanism and projecting means, of a lamp-house secured to the case, a fixedly held condenser disposed in the case, a support for a lamp in which it is rotatably adjustable, adjustable connections for the support which permit fore-and-aft and transverse adjustment of the support to position the lamp relatively to the condenser, and means for securing the support in its adjusted position.

7. In a motion picture projector, the combination with a carrying case containing a film, film-feeding mechanism and projecting means, of a lamp-house secured in said case and having an opening in its back, a reflector supported in said opening, said wall being spaced from the case so the back of the reflector will be exposed to the circulation of air in the case and around the lamp-house, and means for supporting a lamp in the house.

8. In a motion picture projector, the combination with a carrying case containing a film, film-feeding mechanism and projecting means, of a lamp-house secured in said case and having an opening in its back, a reflector supported in said opening, said wall being spaced from the case so the back of the reflector will be exposed to the circulation of air in the case and around the lamp-house, and means for supporting a lamp in the house, said house and reflector being conjointly removable from the case.

9. In a motion picture projector, the combination with a carrying case containing a film, film-feeding mechanism and projecting means, of a lamp-house removably secured in the case, a reflector supported by and removable with the lamp-house and a lamp-support, adjustable relatively to the reflector and connected to the case independently of the lamp-house.

10. In a motion picture projector, the combination with a carrying case containing a film, film-feeding mechanism and projecting means, of a lamp-house, a condenser and reflector carried by the lamp-house, adjustable means to secure the lamp-house in the case so the condenser and reflector may be accurately positioned relatively to the projecting means, and means to support a lamp in the house.

11. In a motion picture projector, the combination with a carrying case containing a film, film-feeding mechanism and projecting means, of a lamp-house, a condenser mounted on the house, means for removably supporting the lamp-house in the case, adjustable so the house may be positioned in the case accurately relatively to the projecting means, and means to support a lamp in said house.

12. In a motion picture projector, the combination with a carrying case containing a film, film-feeding mechanism and projecting means, of a lamp-house, a condenser mounted on the house, a support for the lamp-house adjustably connected to the case so the house may be accurately positioned relatively to the projecting means, and a lamp support adjustably connected to the case so the lamp may be accurately positioned in the house.

13. In a motion picture projector, the combination with a carrying case containing a film, film-feeding mechanism and projecting means, of a lamp-house, a condenser mounted on the house, guides secured to the case on which the house is slidably held, means to removably lock the house on said guides, and means to support a lamp in the house.

14. In a motion picture projector, the combination with a carrying case containing a film, film-feeding mechanism and projecting means, of a lamp-house, a condenser mounted on the house, guides adjustably secured to the case and on which the house is slidably held, means to removably lock the house on said guides, and means to support a lamp in the house.

15. In a motion-picture machine, the combination of a portable carrying-case, means in the case for holding a film, film-feeding mechanism in said case, a lamp-house in said case, a partition dividing the space in the case into a film compartment and a lamp-house compartment, a motor in the latter compartment and a slide in the partition and removable laterally from the case.

HERMAN A. DE VRY.